(12) United States Patent
Cha et al.

(10) Patent No.: US 9,288,421 B2
(45) Date of Patent: Mar. 15, 2016

(54) METHOD FOR CONTROLLING EXTERNAL INPUT AND BROADCAST RECEIVING APPARATUS

(71) Applicant: SAMSUNG ELECTRONICS CO., LTD., Suwon-si (KR)

(72) Inventors: Tae-hwan Cha, Yongin-si (KR); Sung-woo Park, Seoul (KR); Yui-yoon Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 272 days.

(21) Appl. No.: 13/926,253

(22) Filed: Jun. 25, 2013

(65) Prior Publication Data
US 2014/0019140 A1 Jan. 16, 2014

(30) Foreign Application Priority Data

Jul. 12, 2012 (KR) .................. 10-2012-0076137
Feb. 5, 2013 (KR) .................. 10-2013-0012988

(51) Int. Cl.
*G10L 15/00* (2013.01)
*H04N 5/44* (2011.01)
*H04N 5/765* (2006.01)
(Continued)

(52) U.S. Cl.
CPC ............... *H04N 5/4403* (2013.01); *H04N 5/44* (2013.01); *H04N 5/765* (2013.01); *H04N 21/42203* (2013.01); *H04N 21/439* (2013.01); *H04N 21/43615* (2013.01); *H04N 21/44227* (2013.01); *H04N 21/485* (2013.01); *H04N 21/654* (2013.01); *H04N 21/6582* (2013.01); *G10L 15/00* (2013.01); *G10L 15/26* (2013.01)

(58) Field of Classification Search
CPC .... G10L 15/22; G10L 15/265; H04N 5/4432; H04L 12/282
See application file for complete search history.

(56) References Cited

U.S. PATENT DOCUMENTS 5,893,064 A 4/1999 Kudirka et al.
6,535,854 B2 * 3/2003 Buchner et al. ............... 704/275
(Continued)

FOREIGN PATENT DOCUMENTS

EP 1 207 516 A1 5/2002
EP 1 513 136 A1 3/2005
(Continued)

OTHER PUBLICATIONS

International Search Report for PCT/KR2013/006243 dated Nov. 6, 2013 [PCT/ISA/210].
(Continued)

*Primary Examiner* — Daniel Abebe
(74) *Attorney, Agent, or Firm* — Sughrue Mion, PLLC (57) ABSTRACT

A method for controlling an external input and a broadcast receiving apparatus are provided. The method includes: setting a call word of an external input apparatus connected through an external input terminal; associating the call word with the external input terminal and storing the call word and the external input terminal in association with each other; in response to a voice of a user being input, recognizing the voice to determine whether the voice includes the call word; and in response to determining the voice includes the call word, enabling the external input terminal corresponding to the call word to communicate with the external input apparatus using the external input terminal corresponding to the call word.

19 Claims, 5 Drawing Sheets (51) Int. Cl.
*H04N 21/422* (2011.01)
*H04N 21/436* (2011.01)
*H04N 21/439* (2011.01)
*H04N 21/442* (2011.01)
*H04N 21/485* (2011.01)
*H04N 21/654* (2011.01)
*H04N 21/658* (2011.01)
*G10L 15/26* (2006.01)

(56) References Cited

U.S. PATENT DOCUMENTS

| | | | |
|---|---|---|---|
| 6,584,439 B1 * | 6/2003 | Geilhufe et al. | 704/270 |
| 6,762,692 B1 | 7/2004 | Mingot et al. | |
| 7,548,858 B2 | 6/2009 | Wang | |
| 7,752,050 B1 | 7/2010 | Hameed et al. | |
| 8,032,383 B1 | 10/2011 | Bhardwaj et al. | |
| 2002/0069063 A1 * | 6/2002 | Buchner et al. | 704/270 |
| 2002/0161572 A1 * | 10/2002 | Kusumoto | 704/201 |
| 2004/0083107 A1 | 4/2004 | Noda et al. | |
| 2004/0176954 A1 | 9/2004 | Wang | |
| 2006/0277050 A1 | 12/2006 | Kaneko et al. | |
| 2006/0287869 A1 | 12/2006 | Kaneko et al. | |
| 2007/0118382 A1 | 5/2007 | Kuboyama et al. | |
| 2009/0030681 A1 | 1/2009 | Sureka et al. | |
| 2011/0060592 A1 | 3/2011 | Kang et al. | |
| 2011/0283324 A1 | 11/2011 | Oh | |

FOREIGN PATENT DOCUMENTS

| | | |
|---|---|---|
| KR | 10-2011-0114997 A | 10/2011 |
| RU | 2360281 C2 | 6/2009 |

OTHER PUBLICATIONS

Written Opinion for PCT/KR2013/006243 dated Nov. 6, 2013 [PCT/ISA/237].
Communication from the European Patent Office issued Dec. 20, 2013 in a counterpart European Application No. 13176191.8.
Communication dated Nov. 24, 2015, issued by the Russian Federal Service for Intellectual Property in counterpart Russian Patent Application No. 2014153587/07.

* cited by examiner

FIG. 4 a broadcast receiving apparatus. The method may include: setting a call word of an external input apparatus connected through an external input terminal; associating the call word with the external input terminal and storing the call word and the external input terminal in association with each other; in response to a voice of a user being input, recognizing the voice to determine whether the voice includes the call word; and in response to determining the voice includes the call word, enabling the external input terminal corresponding to the call word to communicate with the external input apparatus using the external input terminal corresponding to the call word.

METHOD FOR CONTROLLING EXTERNAL INPUT AND BROADCAST RECEIVING APPARATUS

CROSS-REFERENCE TO RELATED APPLICATION(S)

This application claims priority under 35 U.S.C. §119 from Korean Patent Application Nos. 10-2012-0076137, filed on Jul. 12, 2012 and 10-2013-0012988, filed on Feb. 5, 2013, in the Korean Intellectual Property Office, the disclosures of which are incorporated herein by reference in their entireties.

BACKGROUND

1. Field

Apparatuses and methods consistent with exemplary embodiments relate to controlling an external input, recognizing a voice of a user in an interactive voice recognizing system to control an external input and a broadcast receiving apparatus.

2. Description of the Related Art

In order to meet a demand of a user who wants to play contents by using various types of external input apparatuses, a broadcast receiving apparatus, such as a television (TV), includes a plurality of external input terminals. For example, the broadcast receiving apparatus may include various types of external terminals such as an audio/video (AV) terminal, a component terminal, and a High Definition Multimedia Interface (HDMI) terminal.

A control apparatus, such as a remote controller, is used to enable an external input terminal. However, if the external input terminal is enabled by using an external apparatus such as the remote controller, it may be necessary for the user to hold the external apparatus.

In order to reduce this inconvenience, a method of enabling an external input terminal by using voice recognition has been developed. However, if the external input terminal is enabled by using voice recognition, a broadcast receiving apparatus may only change the external input terminal by using a pre-stored call word. For example, in order to change the external input terminal to a component terminal, the user must utter a call word "component terminal."

The user has to be well informed of an unfamiliar technical term such as "component" in order to change the external input terminal by using voice recognition. Also, the technical term "component" arouses an antipathy of the user toward an entertainment element, and thus the user does not utilize the voice recognition.

SUMMARY

Exemplary embodiments address at least the above problems and/or disadvantages and other disadvantages not described above. Also, the exemplary embodiments are not required to overcome the disadvantages described above, and an exemplary embodiment may not overcome any of the problems described above.

The exemplary embodiments provide a method for controlling an external input, by which a call word is set by a user to correspond to an external input terminal, the call word and the external input terminal are stored in order to change the external input terminal, and if the call word set by the user is recognized, the external input terminal corresponding to the call word is changed, and a broadcast receiving apparatus.

According to an aspect of an exemplary embodiment, there is provided a method for controlling an external input of a broadcast receiving apparatus. The method may include: setting a call word of an external input apparatus connected through an external input terminal; associating the call word with the external input terminal and storing the call word and the external input terminal in association with each other; in response to a voice of a user being input, recognizing the voice to determine whether the voice includes the call word; and in response to determining the voice includes the call word, enabling the external input terminal corresponding to the call word to communicate with the external input apparatus using the external input terminal corresponding to the call word.

The method may further include: in response to determining that a new external input apparatus is connected through the external input terminal, determining whether the new external input apparatus is the same as a previous external input apparatus connected through the external input terminal; in response to determining that the new external input apparatus is different from the previous external input apparatus, setting a call word of the new external input apparatus; and associating the call word of the new external input apparatus with the external input terminal and storing the call word and the external input terminal.

The determining whether the new external input apparatus is the same as the previous external input apparatus may include: in response to determining the new external input apparatus is connected through the external input terminal, displaying a user interface (UI) inquiring whether the new external input apparatus is the same as the previous external input apparatus; and determining whether the new external input apparatus is the same as the previous external input apparatus, according to an input of the user which is input through the UI.

The setting of the call word may include: displaying a UI which is used to set the call word of the external input apparatus connected through the external input terminal.

The UI may be displayed after the power of the broadcast receiving apparatus is initially turned on.

The recognizing the voice to determine whether the voice includes the call word may include: receiving the voice of the user, processing the voice as a digital signal; transmitting the digital signal to an external server; receiving text information corresponding to the digital signal from the external server; and determining whether the text information includes the call word.

The method may further include: in response to determining the voice includes a control command for controlling the external input apparatus, transmitting a control signal corresponding to the control command to the external input apparatus.

The call word may be one of a call word pre-stored in the broadcast receiving apparatus and a call word input by the user.

According to an aspect of another exemplary embodiment, there is provided a broadcast receiving apparatus including: an external input terminal which is configured to connect to an external input; a call word setter which sets a call word of an external input apparatus connected through the external input terminal; a storage which associates the call word with an external input terminal and stores the call word and the external input terminal in association with each other; a voice recognizer which receives a voice of a user and recognizes the voice; and a controller which determines whether the voice recognized through the voice recognizer includes the call word, and in response to determining the voice includes the call word, enables the external input terminal corresponding to the call word to communicate with the external input apparatus using the external input terminal corresponding to the call word.

In response to determining that a new external input apparatus is connected through the external input terminal, the controller may determine whether the new external input apparatus is the same as a previous external input apparatus connected through the external input terminal, and wherein in response to determining that the new external input apparatus is different from the previous external input apparatus, the controller controls the call word setter to set a call word of the new external input apparatus, and associates the call word of the new external input apparatus with the external input terminal, and store the call word and the external input terminal in the storage.

In response to determining that the new external input apparatus is connected through the external input terminal, the controller may control a display to display a UI, inquiring whether the new external input apparatus is the same as the previous external input apparatus, and determine whether the new external input apparatus is the same as the previous external input apparatus, according to an input of the user which is input through the UI.

The call word setter may display a UI which is used to set the call word of the external input apparatus connected through the external input terminal.

The UI may be displayed after the power of the broadcast receiving apparatus is initially turned on.

The voice recognizer may include: a voice signal processor which receives the voice of the user and processes the voice as a digital signal; and a communicator which transmits the digital signal to an external server and receives text information corresponding to the digital signal from the external server, wherein the controller determines whether the text information received from the external server comprises the call word.

In response to determining the user voice includes a control command for controlling the external input apparatus, the controller may generate a control signal corresponding to the control command and transmit the control signal to the external input apparatus through the external input terminal.

The call word may be one of a call word pre-stored in the broadcast receiving apparatus and a call word input by the user.

According to an aspect of another exemplary embodiment, there is provided a method for controlling an external input of a broadcast receiving apparatus. The method may include: associating a call word with an external input terminal and storing the call word and the external input terminal; receiving a voice of a user; determining whether the voice of the user includes the call word; and in response to determining the voice of the user includes the call word, communicating with an external input apparatus using the external input terminal associated with the call word.

The associating of the call word may include displaying a user interface which is used to associate the call word with the external input terminal.

The call word may be one of a call word pre-stored in the broadcast receiving apparatus and a call word input by the user.

BRIEF DESCRIPTION OF THE DRAWINGS

The above and/or other aspects will be more apparent by describing certain exemplary embodiments with reference to the accompanying drawings, in which.

DETAILED DESCRIPTION OF EXEMPLARY EMBODIMENTS

Exemplary embodiments are described in greater detail with reference to the accompanying drawings.

In the following description, the same drawing reference numerals are used for the same elements even in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, well-known functions or constructions are not described in detail since they would obscure the exemplary embodiments with unnecessary detail.

Figure 1:
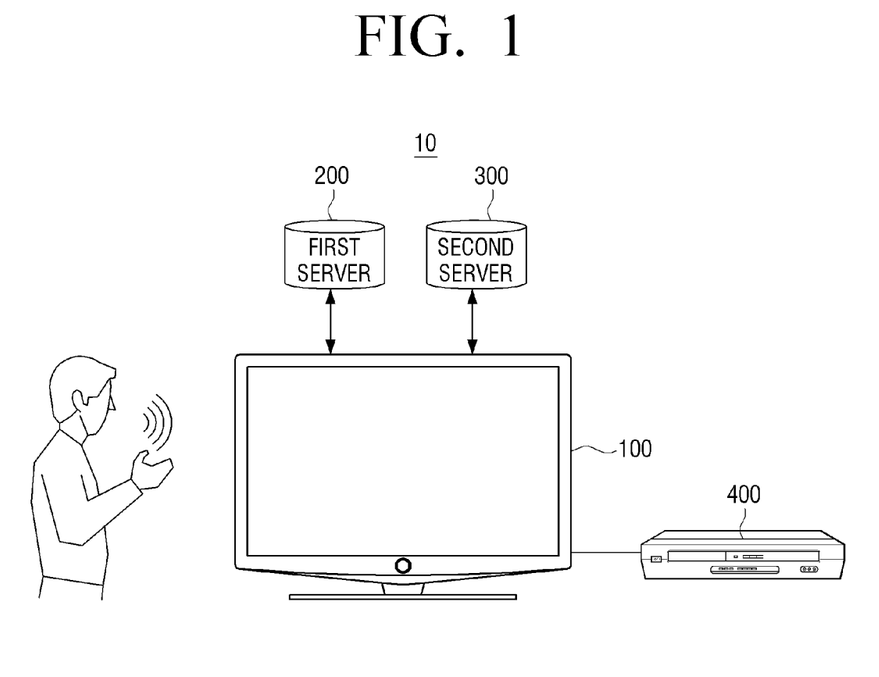
FIG. 1 is a view illustrating an interactive voice recognizing system according to an exemplary embodiment.

FIG. 1 is a view illustrating an interactive voice recognizing system 10 according to an exemplary embodiment of the present general inventive concept. Referring to FIG. 1, the interactive voice recognizing system 10 includes a broadcast receiving apparatus 100, a first server 200, a second server 300, and an external input apparatus 400. Here, the external input apparatus 400 may be a video cassette recorder (VCR), a digital versatile disc (DVD), a blue-ray disc (BD), a set-top box, a game machine, or a universal serial bus (USB) device.

If a user voice is input through a voice input apparatus, the broadcast receiving apparatus 100 converts the user voice into a digital signal and transmits the digital signal to the first server 200. If the digital signal is received from the broadcast receiving apparatus 100, the first server 200 converts the digital signal corresponding to the user voice into text information and transmits the text information to the broadcast receiving apparatus 100.

The broadcast receiving apparatus 100 performs a function based on the text information received from the first server 200. For example, the broadcast receiving apparatus 100 may control an external input based on the text information.

Alternatively, the broadcast receiving apparatus 100 transmits the text information received from the first server 200 to the second server 300. If the text information is received from the broadcast receiving apparatus 100, the second server 300 generates response information corresponding to the received text information and transmits the response information to the broadcast receiving apparatus 100. Here, the response information may include at least one of a response text corresponding to the user voice, a control signal, and a content search result. A response message is text information which is to respond to the user voice like having a conversation with a user. For example, if the user voice is "Search for $_{13}$ ________.", the response message may be text information which is to respond to a user voice like "I will search for it." The control signal is a signal which corresponds to the user voice and is to control the broadcast receiving apparatus 100. For example, if the user voice is "Change channel to $_{13}$ ________ (channel name).", the control signal may be a signal which is to control a tuner of the broadcast receiving apparatus 100 to select a channel corresponding to the user voice. The content search result is information which is to respond to a content search request of the user. For example, if the user voice is "Who is hero of $_{13}$________(movie name)?", the content search result is hero search result information of a movie corresponding to the user voice.

The broadcast receiving apparatus 100 performs voice recognition and various operations based on the response information. In particular, the broadcast receiving apparatus 100 outputs the response message corresponding to the user voice as a voice or a text. For example, if a user voice inquiring about a broadcast time of a particular program such as "When does the news start?" is input, the broadcast receiving apparatus 100 outputs response information, which is received from the second server 300 and includes broadcast time information of the corresponding program such as "News starts at 9 pm.", as a voice or a text.

The broadcast receiving apparatus 100 also performs a function corresponding to the user voice. For example, if a user voice for changing a channel is input, the broadcast receiving apparatus 100 selects and displays a corresponding channel. In this case, the broadcast receiving apparatus 100 may provide a response message corresponding to the function together. In the above-described example, the broadcast receiving apparatus 100 outputs information about the changed channel or a message indicating that the channel has been completely changed, as a voice or a text.

In particular, in order to control an external input terminal by using voice recognition, the broadcast receiving apparatus 100 sets a call word or a plurality of call words of the external input apparatus 400 which is connected through the external input terminal. Here, the broadcast receiving apparatus 100 may set the call word of the external input apparatus 400 by using a user interface (UI) for setting a call word. The UI for setting the call word may be displayed if power of the broadcast receiving apparatus 100 is initially turned on or if a new external input apparatus 400 is connected to the broadcast receiving apparatus 100.

The broadcast receiving apparatus 100 associates the set call word or a plurality of call words with an external input terminal corresponding to the call word and stores the call word. Here, the broadcast receiving apparatus 100 may associate a call word with each of a plurality of external input terminals and store the call word.

If a user voice for changing the external input terminal is input, the broadcast receiving apparatus 100 receives text information corresponding to the user voice by using the first server 200.

The broadcast receiving apparatus 100 determines whether the user voice includes the call word or the plurality of call words of the external input apparatus 400. If the user voice includes the call word of the external input apparatus 400, the broadcast receiving apparatus 100 enables an external input terminal corresponding to the call word to display an image received from the external input terminal corresponding to the call word.

As described above, the user sets a desired term as a call word, which is to enable an external input terminal, through the interactive voice recognizing system 10 to further intuitively control the external input terminal by using voice recognition.

The first and second servers 200 and 300 are separated from each other for voice recognition in the above-described exemplary embodiment, but this is only exemplary. The first and second servers 200 and 300 may be integrated.

Figure 2:
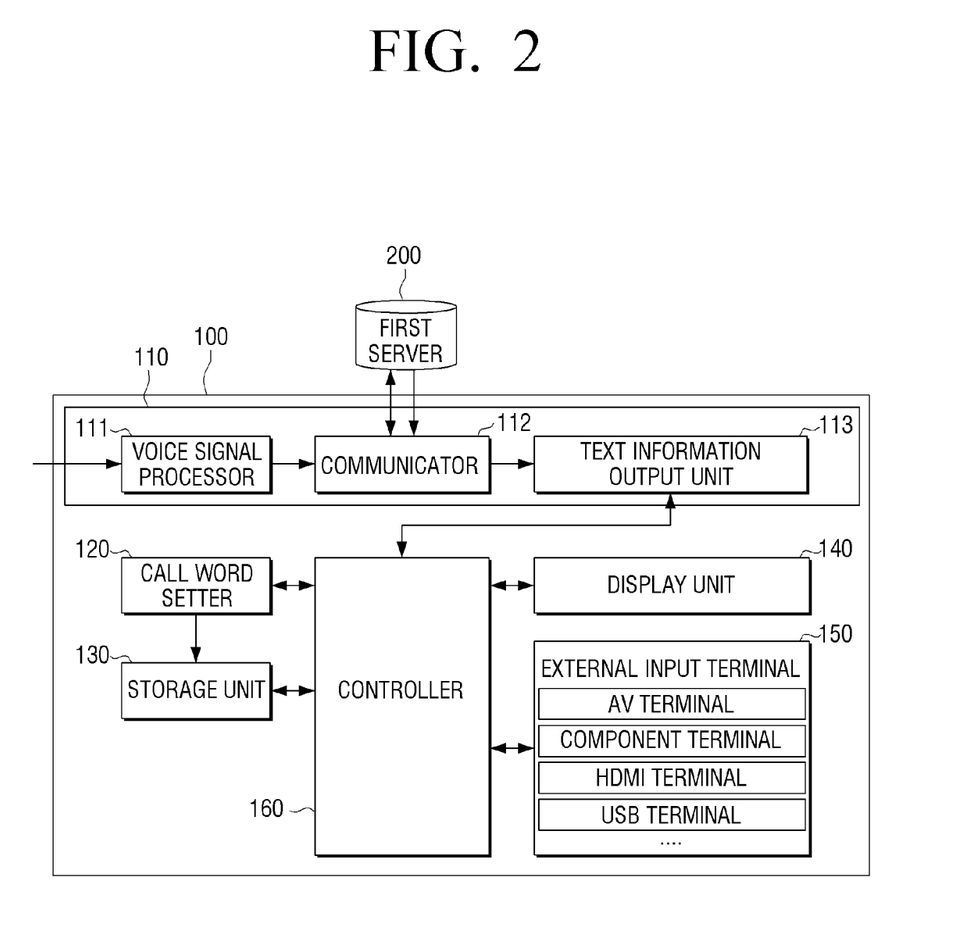
FIG. 2 is a block diagram illustrating a structure of a broadcast receiving apparatus according to an exemplary embodiment.

The broadcast receiving apparatus 100 will now be described in more detail with reference to FIG. 2. Referring to FIG. 2, the broadcast receiving apparatus 100 includes a voice recognizer 110, a call word setter 120, a storage unit 130 (e.g., a memory, a storage, etc.), a display unit 140 (e.g., a display, etc.), an external input terminal 150, and a controller 160. Here, the broadcast receiving apparatus 100 may be a TV but is not limited thereto. Therefore, the broadcast receiving apparatus 100 may be an apparatus such as a monitor, a projector, or the like.

The voice recognizer 110 recognizes a voice uttered by a user to output text information corresponding to the user voice. In particular, the voice recognizer 110 according to the present exemplary embodiment includes a voice signal processor 111, a communicator 112, and a text information output unit 113 (e.g., a text information output device).

The voice signal processor 111 converts an analog user voice input through a voice input apparatus, such as a microphone, into a digital signal. The voice signal processor 111 calculates an energy of the digital signal to determine whether the energy of the digital signal is higher than or equal to a preset value. If the energy of the digital signal is lower than the preset value, the voice signal processor 111 determines that the input digital signal is not the user voice and thus waits for another user voice. If the energy of the digital signal is higher than or equal to the preset value, the voice signal processor 111 removes noise from the input digital signal. In particular, the voice signal recognizer 111 removes unexpected noise (e.g., an air conditioner sound, a vacuum cleaner sound, a music sound, or the like), which may occur in a home environment, from the input digital signal. The voice signal processor 111 outputs the digital signal, from which the noise has been removed, to the communicator 112.

The communicator 112 transmits the digital signal, from which the noise has been removed, to the first server 200 and receives text information corresponding to the digital signal from the first server 200. The first server 200 searches for the text information corresponding to the digital signal, into which the user voice has been converted, by using a pre-stored database (DB).

The text information output unit 113 outputs the text information received through the first server 200 to the controller 160.

The call word setter 120 sets a call word of the external input apparatus 400 connected to the external input terminal 150. Here, the call word of the external input apparatus 400 may be a command which is to enable the external input terminal 150 to which the external input apparatus 400 is connected.

Figure 3:
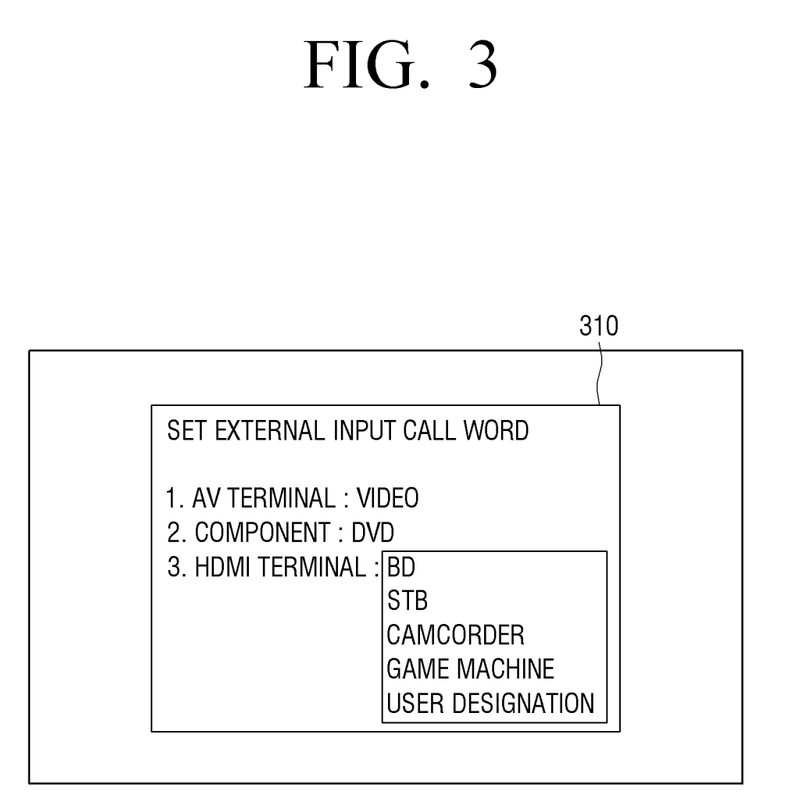
FIG. 3 is view illustrating a user interface (UI) for setting a call word according to an exemplary embodiment.

In particular, as shown in FIG. 3, the call word setter 120 generates a UI 310, which is to set a call word, to set the call word of the external input apparatus 400. The call word of the external input apparatus 400 which may be set by the user may be one of a call word pre-stored in the broadcast receiving apparatus 100 and a call word input by the user. For example, as shown in FIG. 3, the call word of the external input apparatus 400 may be a call word pre-stored in the broadcast receiving apparatus 100 such as a VCR, a DVD, a BD, a set-top box (STB), a camcorder, a game machine, or the like, or may be a call word designated by the user such as "video," "television," or "game". The call word designated by the user may be set through a menu "User Designation" of the UI 310 shown in FIG. 3.

The call word setter 120 may also set call words of a plurality of external input apparatuses which are respectively connected to a plurality of external input terminals 150. For example, according to a user input, the call word setter 120 may set a call word of a VCR, which is connected to an AV terminal, to "video," a call word of a DVD, which is connected to a component terminal, to "DVD," and a call word of a BD, which is connected to an HDMI terminal, to "Blue-ray."

The storage unit 130 stores various types of data and programs which are to control an operation of the broadcast receiving apparatus 100.

In particular, the storage unit 130 associates the call word of the external input apparatus 400 set by the call word setter 120 with an external input terminal and then stores the call word and the external input terminal. For example, the storage unit 130 may associate the call word of the external input apparatus 400 with the external input terminal and store the call word and the external input terminal in a DB as shown in Table 1 below.

TABLE 1

| External Input Terminal | Call Word |
|---|---|
| AV Terminal | Video |
| Component Terminal | DVD |
| HDMI Terminal | Blue-ray |

The display unit 140 displays image data received from various types of sources. In particular, the display unit 140 may display image data received from an external input apparatus connected through the external input terminal 150.

The external input terminal 150 is connected to the external input apparatus 400 to receive various types of data (e.g., image data, voice data, additional data, etc.) from the external input apparatus 400. As shown in FIG. 2, the external input terminal 150 includes an AV terminal, a component terminal, an HDMI terminal, a USB terminal, etc. but is not limited thereto. Therefore, the external input terminal 150 may include another external input terminal such as a PC terminal.

The controller 160 controls an overall operation of the broadcast receiving apparatus 100 according to a user input. In particular, the controller 160 determines whether a user voice recognized by the voice recognizer 110 includes a call word, if the user voice includes the call word, enables an external input terminal corresponding to the call word, and controls the display unit 140 to display an image received from the external input terminal corresponding to the call word.

In detail, if the user voice is input into a voice input apparatus, the controller 160 determines text information corresponding to the user voice by using the voice recognizer 110. The controller 160 also determines whether text information input from the voice recognizer 110 includes the call word of the external input apparatus 400.

If the text information includes the call word of the external input apparatus 400, the controller 160 enables the external input terminal 150 corresponding to the call word. The controller 160 processes an image received from the enabled external input terminal 150 and displays the processed image on the display unit 140. For example, if text information corresponding to a user voice is "Change to video," the controller 160 may determine that the text information includes a call word "video" of the external input apparatus. The controller 160 may enable the AV terminal corresponding to the call word "video." The controller 160 may process and display image data received through the AV terminal. As another example, if the text information corresponding to the user voice is "Turn on DVD," the controller 160 may determine that the text information includes the call word "DVD" of the external input apparatus. The controller 160 may enable the component terminal corresponding to the call word "DVD." The controller 160 may process and display image data received through the component terminal.

If power of the external input apparatus 400 connected to the external input terminal 150 is not turned on or an image is not output, the controller 160 may display a standby screen until image data is output from the external input apparatus 400.

Figure 4:
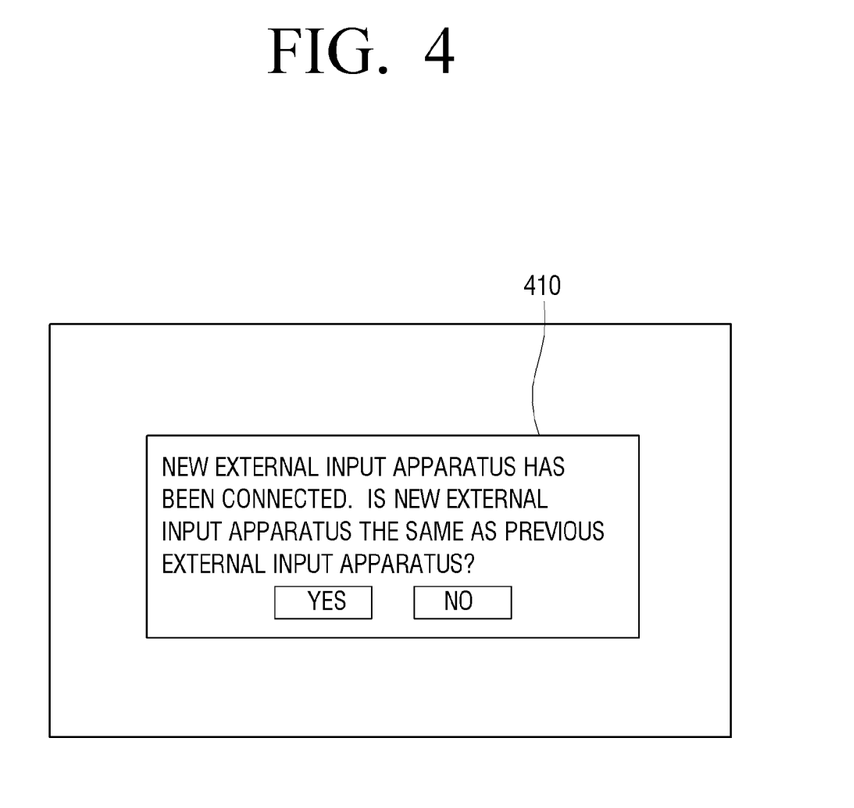
FIG. 4 is a view illustrating a UI for checking an external input apparatus according to an exemplary embodiment.

If a new external input apparatus is connected through the external input terminal 150, the controller 160 determines whether the new external input apparatus is the same as an existing external input apparatus connected through the external input apparatus 150. In particular, the controller 160 may determine whether the new external input apparatus is the same as the existing external input apparatus, by using a UI for inquiring about whether a new external input apparatus is the same as an existing external input apparatus. For example, as shown in FIG. 4, the controller 160 may determine whether the new external input apparatus is the same as the existing input apparatus, by using a UI 410 including a message "New external input apparatus has been connected. Is this external input apparatus the same as previous external input apparatus?".

If the new external input apparatus is different from the existing external input apparatus, the controller 160 controls the call word setter 120 to set a call word of the new external input apparatus, associates the call word of the new external input apparatus with an external input terminal, and stores the call word and the external input terminal in the storage unit 130. For example, if an existing external input apparatus connected to the AV terminal is a VCR, and a newly connected external input apparatus is an STB, the controller 160 may determine whether the new external input apparatus is different from the existing external input apparatus, according to an input of the user. The controller 160 may also control the call word setter 120 to display the UI 310 which is to set the call word as shown in FIG. 3. If a call word of the STB is set to "television" by using the UI 310 which is to set the call word, the controller 160 may update the DB shown in Table 1 as shown in Table 2 below.

TABLE 2

| External Input Terminal | Call Word |
|---|---|
| AV Terminal | Television |
| Component Terminal | DVD |
| HDMI Terminal | Blue-ray |

If the user voice includes a control command with respect to an external input apparatus, the controller 160 may transmit a control signal corresponding to the control command to the external input apparatus. For example, if text information corresponding to the user voice is "Turn on Blue-ray," the controller 160 may determine a play command by using text information "Turn on" and transmit a control signal of the play command to the BD connected to the HDMI terminal.

Here, if the external input terminal 150 is the HDMI terminal capable of transmitting a control signal, the controller 160 may immediately transmit a control signal corresponding to a control command through the external input terminal 150. If the control signal is not transmitted through the external input terminal 150, the controller 160 may transmit the control signal to an external remote controller, and the external remote controller may transmit the control signal to the external input apparatus 400.

As described above, a user may set a familiar word to a call word of the external input apparatus 400 through the broadcast receiving apparatus 100 and thus may further intuitively control an external input terminal by using voice recognition.

Figure 5:
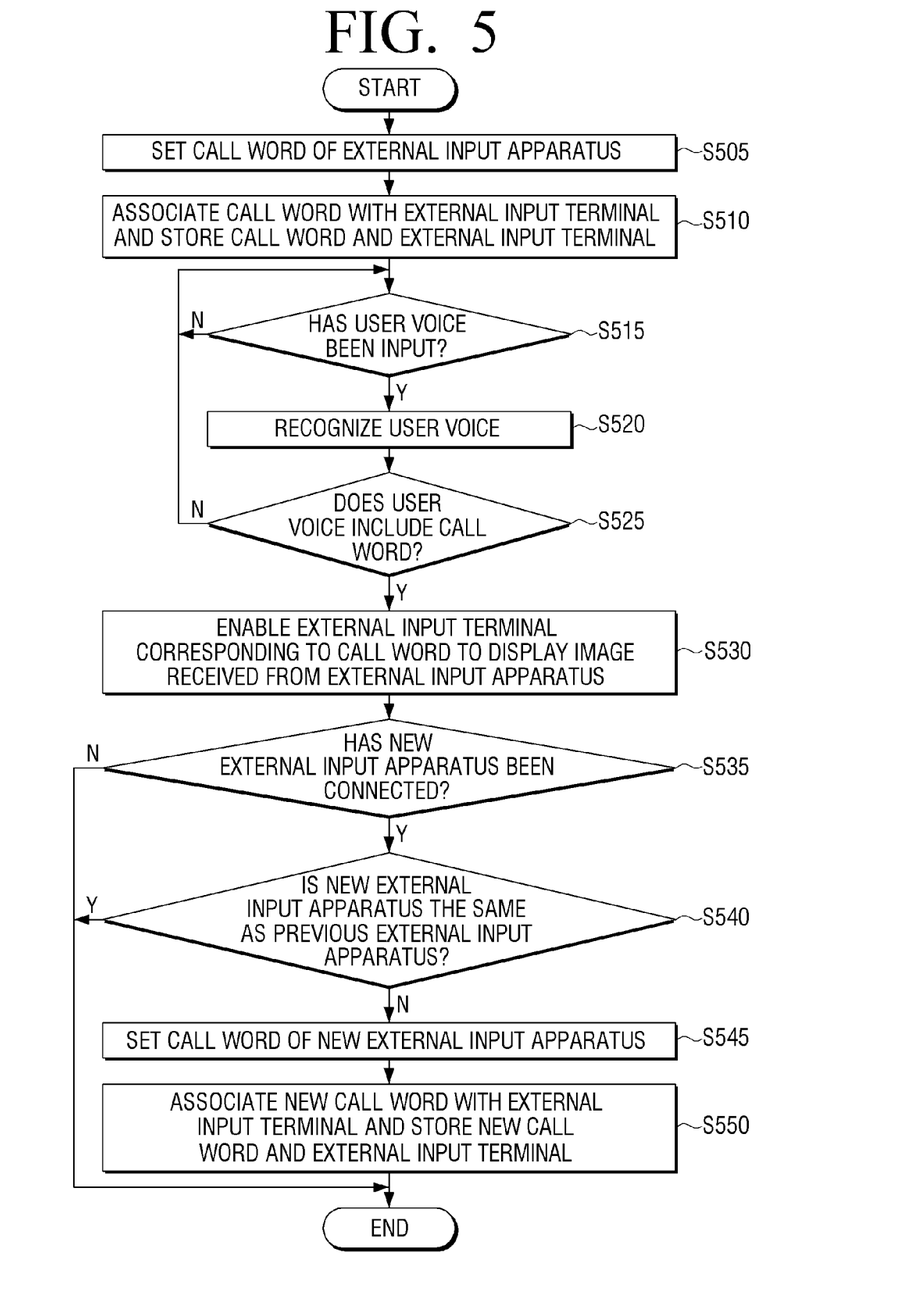
FIG. 5 is a flowchart illustrating a method for controlling an external input according to an exemplary embodiment.

A method for controlling an external input of the broadcast receiving apparatus 100 will now be described in detail with reference to FIG. 5.

In operation S505, the broadcast receiving apparatus 100 sets a call word of the external input apparatus 400 connected to an external input terminal. In particular, as shown in FIG. 3, the broadcast receiving apparatus 100 may set the call word of the external input apparatus 400 by using the UI 310 which is used by a user to set the call word of the external input apparatus 400. Here, the UI 310 which is used to set the call word of the external input apparatus 400 may be displayed if power of the broadcast receiving apparatus 100 is initially turned on.

In operation S510, the broadcast receiving apparatus 100 associates the call word with the external input apparatus and stores the call word and the external input terminal. For example, the broadcast receiving apparatus 100 may associate call words with external input terminals and store the call words and the external input terminals as shown in Table 1.

In operation S515, the broadcast receiving apparatus 100 determines whether a user voice has been input.

If it is determined in operation S515 that the user voice has been input, the broadcast receiving apparatus 100 recognizes the user voice in operation S520. Here, the broadcast receiving apparatus 100 may recognize the user voice by using the first server 200 of FIG. 1. However, this is only exemplary, and thus the broadcast receiving apparatus 100 may recognize the user voice by using another method.

In operation S525, the broadcast receiving apparatus 100 determines whether the recognized user voice includes a call word.

If it is determined in operation S525 that the user voice includes the call word, the broadcast receiving apparatus 100 enables the external input terminal corresponding to the call word to display an image received from the external input apparatus 400 corresponding to the call word in operation S530.

In operation S535, the broadcast receiving apparatus 100 determines whether a new external input apparatus has been connected to the external input terminal.

If it is determined in operation S535 that the new external input apparatus has been connected to the external input terminal, the broadcast receiving apparatus 100 determines whether the new external input apparatus is the same as a previous external input apparatus in operation S540. In detail, if the new external input apparatus is connected, the broadcast receiving apparatus 100 may display the UI 410 shown in FIG. 4 and determine whether the new external input apparatus is the same as the previous external input apparatus, according to a user command input into the UI 410 of FIG. 4.

If it is determined in operation S540 that the new external input apparatus is different from the previous external input apparatus, the broadcast receiving apparatus 100 sets a call word of the new external input apparatus in operation S545. In detail, the broadcast receiving apparatus 100 may display the UI 310 which is to set the call word as shown in FIG. 3 to set the call word of the new external input apparatus.

In operation S550, the broadcast receiving apparatus 100 associates the call word with the external input terminal and stores the call word and the external input apparatus.

Through the above-described method, a user may set a more familiar and interesting term to a call word to control an external input terminal.

Voice recognition is performed by using the first server 200 installed outside the broadcast receiving apparatus 100 in the above-described exemplary embodiment, but this is only exemplary. Therefore, the voice recognition may be performed by using a voice recognition DB which performs the same function as the first server 200 installed in the broadcast receiving apparatus 100.

The above-described exemplary embodiment discloses setting a call word of an external input apparatus, but this is merely exemplary, and the technical idea of the invention may be applied to an exemplary embodiment which sets a call word on a specific content or an external link. Specifically, the call word setter 120 sets a call word on a specific content or an external link according to a user input. When a user voice is recognized through the voice recognizer 110, the controller 160 determines whether the recognized user voice includes a call word on a specific content or an external link. And, when a call word on a specific content or an external link is included in the user voice, the controller 160 may run a specific content or an external link corresponding to the call word included in the user voice. In this case, when the call word on a specific content is included in the user voice, the controller 160 may run a content stored in the storage unit 130, and when the call word on an external link is included in the user voice, the controller 160 may judge an address of an external link and get access to the external link. For example, according to a user input, when the call word "A" is set for "content A" stored in the storage unit 130, if "A" is included in the user voice, the controller 160 may run content A stored in the storage unit 130, and when the call word "B" is set for "external link B," if "B" is included in the user voice, the controller 160 may immediately get access to an external link and provide users with the external link.

A program code for performing a method for controlling an external input according to the above-described various exemplary embodiments may be stored on a non-transitory computer readable medium. The non-transitory computer readable medium refers to a medium which does not store data for a short time such as a register, a cache memory, a memory, or the like but semi-permanently stores data and is readable by a device. In detail, the above-described applications or programs may be stored and provided on a non-transitory computer readable medium such as a CD, a DVD, a hard disk, a blue-ray disk, a USB, a memory card, a ROM, or the like.

The foregoing exemplary embodiments and advantages are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A method for controlling an external input of a broadcast receiving apparatus, the method comprising:

setting a call word of an external input apparatus connected to an external input terminal of the broadcast receiving apparatus;

associating the call word with the external input terminal and storing the call word and the external input terminal in association with each other;

in response to a voice of a user being input, recognizing the voice to determine whether the voice includes the call word;

in response to determining the voice includes the call word, enabling the external input terminal corresponding to the call word to communicate with the external input apparatus using the external input terminal corresponding to the call word;

in response to determining that a new external input apparatus is connected through the external input terminal, determining whether the new external input apparatus is the same as a previous external input apparatus connected through the external input terminal; and in response to determining that the new external input apparatus is different from the previous external input apparatus, setting a call word of the new external input apparatus.

2. The method of claim 1, further comprising:

associating the call word of the new external input apparatus with the external input terminal and storing the call word of the new external input apparatus and the external input terminal in association with each other.

3. The method of claim 2, wherein the determining whether the new external input apparatus is the same as the previous external input apparatus comprises:

in response to determining the new external input apparatus is connected through the external input terminal, displaying a user interface (UI) inquiring whether the new external input apparatus is the same as the previous external input apparatus; and determining whether the new external input apparatus is the same as the previous external input apparatus, according to an input of the user which is input through the UI.

4. The method of claim 1, wherein the setting of the call word comprises:

displaying a user interface (UI) which is used to set the call word of the external input apparatus connected through the external input terminal.

5. The method of claim 4, wherein the UI is displayed after the broadcast receiving apparatus is initially turned on.

6. The method of claim 1, wherein the recognizing the voice to determine whether the voice includes the call word comprises:

receiving the voice of the user and processing the voice as a digital signal;

transmitting the digital signal to an external server;

receiving text information corresponding to the digital signal from the external server; and determining whether the text information includes the call word.

7. The method of claim 1, further comprising:

if the voice includes a control command for controlling the external input apparatus, transmitting a control signal corresponding to the control command to the external input apparatus.

8. The method of claim 1, wherein the call word is one of a call word pre-stored in the broadcast receiving apparatus and a call word input by the user.

9. A broadcast receiving apparatus comprising:

an external input terminal which is configured to connect to an external input;

a call word setter which sets a call word of an external input apparatus connected to the external input terminal;

a storage which associates the call word with the external input terminal and stores the call word and the external input terminal in association with each other;

a voice recognizer which receives a voice of a user and recognizes the voice;

a controller which determines whether the voice recognized through the voice recognizer includes the call word, and in response to determining the voice includes the call word, enables the external input terminal corresponding to the call word to communicate with the external input apparatus using the external input terminal corresponding to the call word, wherein in response to determining that a new external input apparatus is connected through the external input terminal, the controller determines whether the new external input apparatus is the same as a previous external input apparatus connected through the external input terminal, and wherein in response to determining that the new external input apparatus is different from the previous external input apparatus, the controller controls the call word setter to set a call word of the new external input apparatus.

10. The broadcast receiving apparatus of claim 9, wherein in response to determining that the new external input apparatus is different from the previous external input apparatus, the controller associates the call word of the new external input apparatus with the external input terminal, and stores the call word of the new external input apparatus and the external input terminal in association with each other in the storage.

11. The broadcast receiving apparatus of claim 10, further comprising a display, wherein in response to determining that the new external input apparatus is connected through the external input terminal, the controller controls the display to display a user interface (UI), which inquires whether the new external input apparatus is the same as the previous external input apparatus, and determines whether the new external input apparatus is the same as the previous external input apparatus, according to an input of the user which is input through the UI.

12. The broadcast receiving apparatus of claim 9, further comprising a display, wherein the controller controls the call word setter to display on the display a user interface (UI) which is used to set the call word of the external input apparatus connected through the external input terminal.

13. The broadcast receiving apparatus of claim 12, wherein the UI is displayed after the broadcast receiving apparatus is initially turned on.

14. The broadcast receiving apparatus of claim 9, wherein the voice recognizer comprises:

a voice signal processor which receives the voice of the user and processes the voice as a digital signal; and a communicator which transmits the digital signal to an external server and receives text information corresponding to the digital signal from the external server, wherein the controller determines whether the text information received from the external server comprises the call word.

15. The broadcast receiving apparatus of claim 9, wherein if the user voice includes a control command for controlling the external input apparatus, the controller generates a control signal corresponding to the control command and transmits the control signal to the external input apparatus through the external input terminal.

16. The broadcast receiving apparatus of claim 9, wherein the call word is one of a call word pre-stored in the broadcast receiving apparatus and a call word input by the user.

17. A method for controlling an external input of a broadcast receiving apparatus, the method comprising:

associating a call word with an external input terminal and storing the call word and the external input terminal;

receiving a voice of a user;

determining whether the voice of the user includes the call word;

in response to determining the voice of the user includes the call word, communicating with an external input apparatus using the external input terminal associated with the call word;

in response to determining that a new external input apparatus is connected through the external input terminal, determining whether the new external input apparatus is the same as a previous external input apparatus connected through the external input terminal; and in response to determining that the new external input apparatus is different from the previous external input apparatus, setting a call word of the new external input apparatus.

18. The method of claim 17, wherein the associating of the call word comprises:

displaying a user interface which is used to associate the call word with the external input terminal.

19. The method of claim 18, wherein the call word is one of a call word pre-stored in the broadcast receiving apparatus and a call word input by the user.

* * * * *